United States Patent [19]

McNair

[11] 4,376,308
[45] Mar. 8, 1983

[54] CONTROL OF COEFFICIENT DRIFT FOR FRACTIONALLY SPACED EQUALIZERS

[75] Inventor: Bruce E. McNair, Holmdel, N.J.

[73] Assignee: Bell Telephone Laboratories, Incorporated, Murray Hill, N.J.

[21] Appl. No.: 249,893

[22] Filed: Apr. 1, 1981

[51] Int. Cl.³ .......................................... H04L 25/03
[52] U.S. Cl. .................................... 375/14; 328/144; 455/303
[58] Field of Search .............. 328/144, 162, 165, 171; 364/574, 718, 721, 722, 724, 851; 375/11–16; 455/63, 303, 304, 308

[56] References Cited

U.S. PATENT DOCUMENTS

| | | | |
|---|---|---|---|
| 3,845,390 | 10/1974 | De Jager et al. | 375/14 |
| 4,190,896 | 2/1980 | Knowlton | 328/144 |
| 4,247,940 | 1/1981 | Mueller et al. | 375/15 |
| 4,309,770 | 1/1982 | Godard | 375/14 |

Primary Examiner—Benedict V. Safourek
Attorney, Agent, or Firm—Ronald D. Slusky

[57] ABSTRACT

Tap coefficient drift in a fractionally spaced equalizer is minimized by causing the sampled signal to have energy in its "no-energy" bands, i.e., at frequencies at which the sampled channel transfer function has substantially zero gain. This is achieved by adding an out-of-band signal to the received data signal prior to sampling. The out-of-band signal is derived from the received data signal.

40 Claims, 12 Drawing Figures

CONTROL OF COEFFICIENT DRIFT FOR FRACTIONALLY SPACED EQUALIZERS

BACKGROUND OF THE INVENTION

The present invention relates to automatic equalizers which compensate for the distorting effects of band-limited channels on transmitted data signals.

Automatic equalizers are necessary for accurate reception of high-speed data signals transmitted over band-limited channels with unknown transmission characteristics. The equalizer is generally in the form of a transversal filter in which a sampled signal comprised of samples of an analog data signal are multiplied by respective tap coefficients. The resulting products are added together to generate an equalizer output which is then demodulated and/or quantized to recover the transmitted data. In addition, an error signal is formed equal to the difference between the equalizer output and a reference signal which represents the transmitted data symbol. The value of the symbol that was transmitted may be known at the receiver a priori, as is the case in many equalizer start-up arrangements. Alternatively, as in the so-called adaptive type of automatic equalizer, the reference signal is derived from the decision made in the receiver (on the basis of the equalized signal value) as to what data symbol was transmitted. In either case, the error signal is used to update the tap coefficient values in such a way as to minimize a measure of the distortion—primarily intersymbol interferences—introduced by the channel. The most commonly used error-directed coefficient updating algorithm is the so-called mean-squared error algorithm, which adjusts the tap coefficients so as to minimize the average of the value of the square of the error signal.

Most high-speed data receivers incorporate a synchronous, or baud, equalizer in which the analog data signal is sampled at a rate equal to the symbol rate. It is, however, possible to use a so-called fractionally spaced equalizer in which the analog data signal is sampled at a higher rate. Data decisions, i.e., quantizations of the equalizer outputs, are still made at the symbol rate. However, the fact that equalization is carried out using a finer sampling interval provides the fractionally spaced equalizer with significant advantages over its more conventional cousin. Most notable among these is insensitivity to channel delay distortion, including sampling phase errors.

There is, however, at least one significant problem unique to the fractionally spaced equalizer. In a synchronous equalizer, one set of tap coefficients is clearly optimum, i.e., provides the smallest average mean-squared error. By contrast, many sets of coefficient values provide approximately the same average mean-squared error in the fractionally spaced equalizer. As a consequence of this property, the presence of small biases in the coefficient updating processing hardware—such as biases associated with signal value round off—can cause at least some of the coefficient values to drift to very large levels, or "blow up," even though the average mean-squared error remains at, or close to, its minimum value. The registers used to store the coefficients or other signals generated during normal equalizer operation can then overflow, causing severe degradation, or total collapse, of the system response.

The copending U.S. patent application of J. J. Werner, Ser. No. 213,463, filed Dec. 5, 1980, which is a continuation of U.S. patent application Ser. No. 84,857, filed Oct. 15, 1979, now abandoned, teaches that the above-outlined coefficient drift problem can be controlled by causing the sampled signal to have energy in frequency bands in which the sampled channel transfer function has substantially zero gain, those frequency bands being referred to as "no-energy bands." This is illustratively achieved by adding to the analog data signal an out-of-band analog signal having energy in at least one no-energy band to form a composite signal which is then sampled.

SUMMARY OF THE INVENTION

In the above-discussed Werner disclosure, the out-of-band signal energy originates from an independent signal generator. In accordance with the present invention, by contrast, the energy of the out-of-band signal is derived from the analog data signal itself. In particular, the out-of-band signal is generated by subjecting the analog data signal to a bandwidth-expanding nonlinear process, such as clipping, squaring, cubing or frequency translation, thereby providing a signal which has energy in at least one or more of the no-energy bands. The resulting signal is then filtered to restrict its energy to a desired no-energy band or bands and is then added back to the analog data signal.

A particular advantage of this approach is that the out-of-band signal automatically disappears when the line signal disappears, thereby obviating the need for circuitry to switch the added energy source on and off and allowing the receiver's carrier detection circuitry to be kept simple.

BRIEF DESCRIPTION OF THE DRAWING

The invention may be clearly understood from a consideration of the following detailed description and accompanying drawing in which.

DETAILED DESCRIPTION

Figure 1:
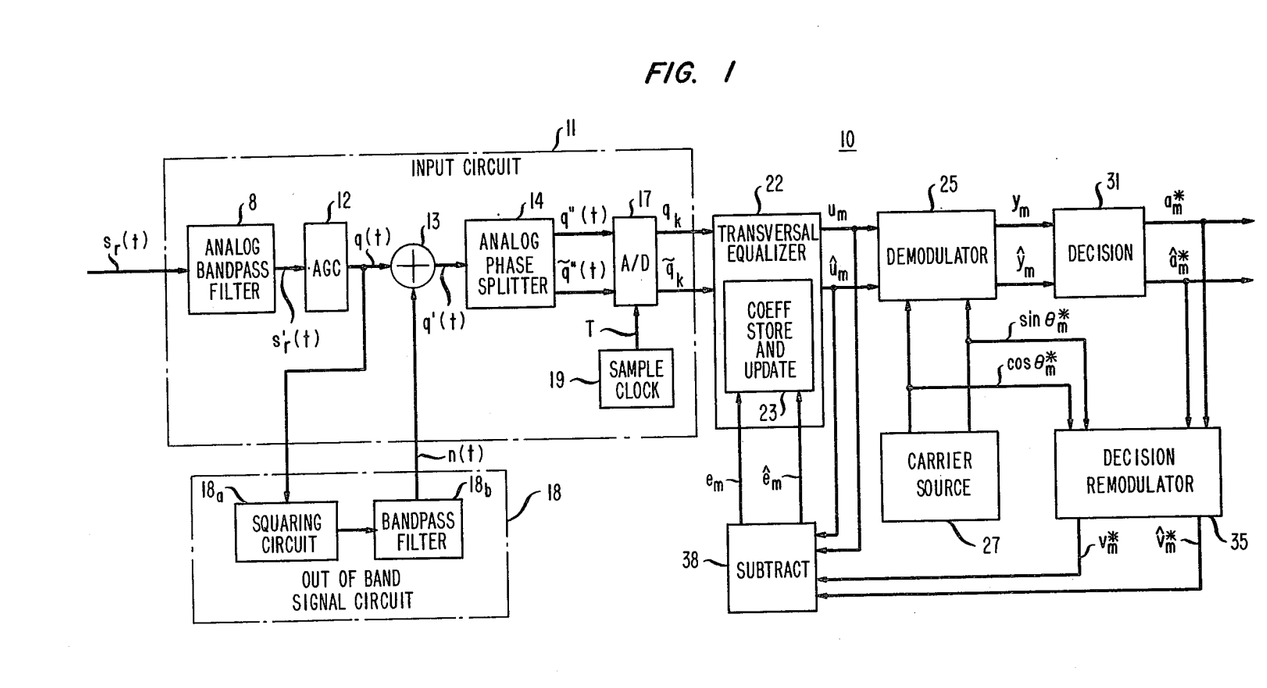
FIG. 1 is a block diagram of a data receiver including circuitry embodying the principles of the invention.

FIG. 1 depicts a receiver 10 for data signals transmitted from a far-end transmitter (not shown) over a band-limited channel, e.g., voiceband telephone circuit. The data signals are illustratively quadrature amplitude modulated (QAM) data signals wherein four paralleled information bits are transmitted during each of a succession of symbol intervals of duration T. The symbol rate is thus 1/T, yielding a binary transmission rate of 4/T bits per second. During each symbol interval, the four bits to be transmitted are encoded into two signal levels each of which can take on one of the four values $[+1, -1, +3, -3]$. The two signal levels, representing a single complex data signal value, or symbol, amplitude modulate respective 1800 Hz in-phase and quadrature-phase carrier waves, which, in combination, comprise a QAM signal which is transmitted to receiver 10.

In receiver 10, the received QAM signal $s_r(t)$ is applied to input circuit 11 and, more particularly, to analog bandpass filter 8 thereof. The function of filter 8 is to filter out any energy in signal $s_r(t)$ outside of the transmission band of interest—in this example the band 600–3000 Hz. The output signal of filter 8 is applied to automatic gain control (AGC) circuit 12 where it emerges as data signal $q(t)$. In accordance with the present invention, data signal $q(t)$ is added in an adder 13 to a signal $n(t)$ generated by out-of-band signal circuit 18. Signal $n(t)$ and circuit 18 are discussed in more detail hereinbelow.

Input circuit 11 further includes an analog phase splitter 14, a sampler in the form of an analog-to-digital (a/d) converter 17 and sample clock 19. Phase splitter 14 responds to the output signal $q'(t)$ of adder 13 to generate two versions of signal $q'(t)$. One of these is $q''(t)$, which may be identical to $q'(t)$ or may be a phase-shifted version of it. The other, represented as $\bar{q}''(t)$, is the Hilbert transform of $q''(t)$. Signals $q''(t)$ and $\bar{q}''(t)$ may be regarded as the real and imaginary components of a complex signal $Q''(t)$.

Signals $q''(t)$ and $\bar{q}''(t)$ are passed to a/d converter 17. The latter is operated by clock 19 p times per symbol interval to generate a sampled signal in the form of equalizer input samples $q_k$ and $\bar{q}_k$, k=1,2 . . . of signals $q''(t)$ and $\bar{q}''(t)$, respectively. Equalizer input samples $q_k$ and $\bar{q}_k$ may be thought of as components of a complex equalizer input sample $Q_k$.

Equalizer input sample components $q_k$ and $\bar{q}_k$ pass on to transversal equalizer 22. The latter generates an output once every T seconds. In particular, the output of equalizer 22 during the $m^{th}$ receiver symbol interval of duration T is complex passband equalizer output $U_m$ having components $u_m$ and $\bar{u}_m$. Equalizer 22 generates its outputs by forming linear combinations of the equalizer input sample components in accordance with the relations $$u_m = c_m^T r_m + d_m^T \bar{r}_m$$
$$\hat{u}_m = c_m^T \hat{r}_m - d_m^T r_m,$$

In these expressions $r_m$ and $\hat{r}_m$ are (N×1) matrices, or vectors, respectively comprised of the N most recent real and imaginary equalizer input sample components, N being a selected integer. That is:

$$r_m = \begin{bmatrix} \hat{q}_k \\ \hat{q}_{k-1} \\ \cdot \\ \cdot \\ \hat{q}_{k-(N-1)} \end{bmatrix} \text{ and } \hat{r}_m = \begin{bmatrix} q_k \\ q_{k-1} \\ \cdot \\ \cdot \\ q_{k-(N-1)} \end{bmatrix}.$$

In addition, $c_m$ and $d_m$ are (N×1) vectors each comprised of an ensemble of N tap coefficients having values associated with the $m^{th}$ receiver interval. (The superscript "T" used in the above expressions indicates the matrix transpose operation wherein the (N×1) vectors $c_m$ and $d_m$ are transposed into (1×N) vectors for purposes of matrix multiplication. It should not be confused with the symbol interval T.) The values of the coefficients in these vectors are determined in the manner described below. Vectors $c_m$ and $d_m$ may be thought of as the real and imaginary components of a complex coefficient vector $C_m$.

Passband equalizer output $U_m$ is demodulated by demodulator 25 to yield baseband output $Y_m$. The latter has real and imaginary components $y_m$ and $\hat{y}_m$, the demodulation process being expressed as $$y_m = u_m \cos\theta_m^* + \hat{u}_m \sin\theta_m^*$$
$$\hat{y}_m = -u_m \sin\theta_m^* + \hat{u}_m \cos\theta_m^*,$$

$\theta_m^*$ being an estimate of the current carrier phase. For purposes of generating $y_m$ and $\hat{y}_m$ in accordance with the above expressions, demodulator 25 receives representations of $\cos\theta_m^*$ and $\sin\theta_m^*$ from a carrier source 27.

(It should be noted at this point that due to processing delay in demodulator 25, baseband output $Y_m$ is not necessarily generated during the $m^{th}$ receiver symbol interval, the latter being defined as the T second interval during which passband equalizer outputs $u_m$ and $\hat{u}_m$ are generated. The subscript m in "$Y_m$" thus does not identify when $Y_m$ is generated but, rather, identifies $Y_m$ as being the baseband version of passband equalizer output $U_m$. Similar considerations apply, for example, to signals $A_m^*$, $\Delta_m$ and $E_m$ discussed below.)

Baseband output $Y_m$ is quantized in decision circuit 31. The resulting output $A_m^*$ is a decision as to the value of a particular transmitted symbol $A_m$. In particular, the real and imaginary parts of $A_m^*$, $a_m^*$ and $\hat{a}_m^*$, are respective decisions as to the two data signal values comprising transmitted symbol $A_m$. Decision circuit 31, more particularly, forms decision $a_m^*(\hat{a}_m^*)$ by identifying the one of the four possible data signal values [+1, −1, +3, −3] which is closest to the value of baseband output component $y_m(\hat{y}_m)$.

Decision $A_m^*$ is also used to generate an error signal for use in updating coefficient vectors $c_m$ and $d_m$. In particular, decision components $a_m^*$ and $\hat{a}_m^*$ are combined in decision remodulator 35 with $\sin\theta_m^*$ and $\cos\theta_m^*$ from carrier source 27 to form remodulated, or passband, decision $V_m^*$. The real and imaginary components of $V_m^*$, $v_m^*$ and $\hat{v}_m^*$, are formed in accordance with $$v_m^* = a_m^*\cos\theta_m^* - \hat{a}_m^*\sin\theta_m^*$$
$$\hat{v}_m^* = a_m^*\sin\theta_m^* + \hat{a}_m^*\cos\theta_m^*.$$

Passband decision $V_m^*$ is subtracted from passband equalizer output $U_m$ in subtractor 38 to yield passband error $E_m$ having components $e_m$ and $\hat{e}_m$ given by $$e_m = u_m - v_m^*$$
$$\hat{e}_m = \hat{u}_m - \hat{v}_m^*.$$

Error signal components $e_m$ and $\hat{e}_m$ are extended to coefficient store and update unit 23 within equalizer 22 for purposes of updating the values of the coefficients in coefficient vectors $c_m$ and $d_m$ in preparation for the next, $(m+1)^{st}$, symbol interval. The so-called mean-squared error stochastic updating algorithm is illustratively used, yielding the updating rules $$c_{m+1} = c_m - \alpha[r_{m-d}e_{m-d} + \hat{r}_{m-d}\hat{e}_{m-d}]$$

-continued $$d_{m+1} = d_m - \alpha [\hat{r}_{m-d}e_{m-d} - r_{m-d}\hat{e}_{m-d}],$$

α being a predetermined constant and d being a selected integer equal to at least the number of symbol intervals of delay between the generation of passband equalizer output $U_m$ and error signal $E_m$. These rules can be written in complex notation as:

$$C_{m+1} = C_m - \alpha R_k E_m.$$

Figure 2:
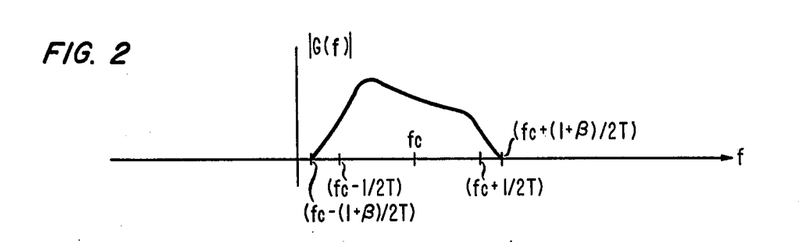
FIGS. 2–5 are signal amplitude vs. frequency plots helpful in explaining the operation of baud-sampled equalizers.

The problem to which the present invention is directed is illustrated in FIGS. 2–10. FIG. 2, in particular, shows the positive frequency portion of the magnitude $|G(f)|$ of the transfer function of a typical voiceband telephone transmission channel. In this discussion, the "transmission channel" is assumed to include the transmitter, the transmission medium and all receiver circuitry through and including the receiver phase splitter. The negative frequency portion of $|G(f)|$ need not be considered since the complex signal $Q''(t)$ at the output of phase splitter 14 is "analytic," i.e., has no negative frequencies. The carrier frequency of the QAM signal to be transmitted is $f_c$. The transmission channel extends from $(f_c-(1+\beta)/2T)$ Hz to $(f_c+(1+\beta)/2T)$ Hz, meaning that within that band the gain provided by the channel is at least some predetermined minimum, e.g., $-40$ db. Outside of that band, the gain is less than that minimum and is presumed to be zero. The parameter $\beta$ is the so-called rolloff factor and has a value between zero and unity given by:

$$\beta = (2f_{co}T - 1)$$

where the frequency $(f_c+f_{co})$ is the upper frequency limit of the transmission channel.

The transfer function $G_s(f)$ of the "sampled channel," defined as the combination of the transmission channel with all receiver circuitry up through and including the sampler, i.e., a/d converter 17, is arrived at by a "folding" operation to yield $$G_s(f) = \sum_{n=-\infty}^{\infty} G(f_c - np/T).$$

It is thus seen that the sampled channel transfer function is a superposition in the frequency domain of repetitions of the unsampled transfer function translated in frequency by multiples of p/T.

Figure 3:
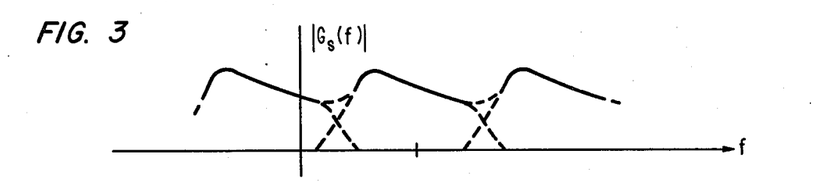
Figure 4:
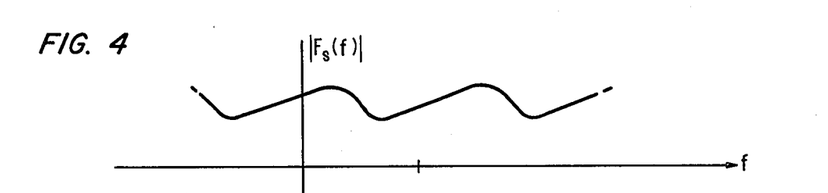
Figure 5:
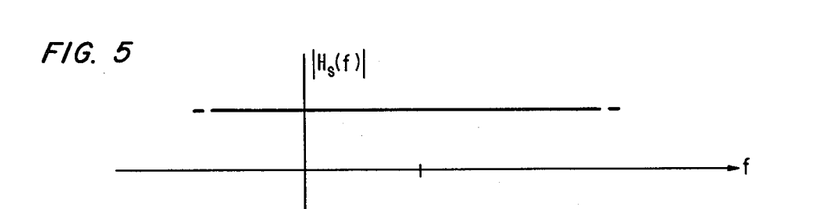

For baud equalization, of course, p=1. As shown in FIG. 3, $|G_s(f)|$ for this case is non-zero for all f because the tails (shown in dotted line) of each translated G(f) overlap and add with those of adjacent translated G(f)'s. A baud equalizer is properly equalized when the equalized channel transfer function, i.e., the overall transfer function of the sampled channel-plus-equalizer combination, has constant gain (and linear phase characteristic) at all frequencies. The magnitude $|H_s(f)|$ of an ideal such transfer function for a baud-sampled receiver is shown in FIG. 5. Thus, for any given channel, there is a unique, optimum equalizer transfer function—corresponding to a unique ensemble of tap coefficient values—which provides the best equalization, i.e., the smallest mean-squared error for baud sampling. The magnitude $|F_s(f)|$ of that optimum equalizer transfer function for the channel under consideration is shown in FIG. 4.

Figure 6:
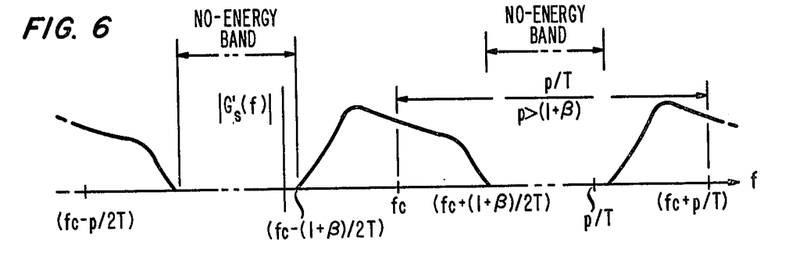
FIGS. 6–10 are signal amplitude vs. frequency plots helpful in explaining the operation of fractionally spaced equalizers and, in particular, the coefficient drift phenomenon which arises therein.

For fractionally spaced equalization, by contrast, $p>(1+\beta)$ so that the tails of adjacent repetitions of $|G(f)|$ do not overlap. They are, rather, separated by what may be referred to as "no-energy bands." This is illustrated in FIG. 6 which shows the transfer function magnitude $|G_s'(f)|$ of G(f) sampled at p/T samples per second, $p>(1+\beta)$.

Figure 7:
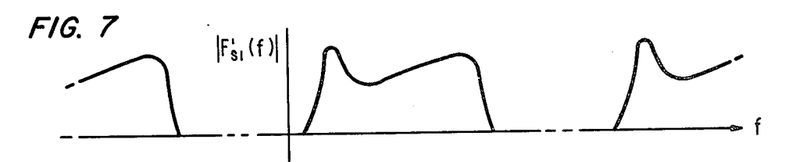
Figure 8:
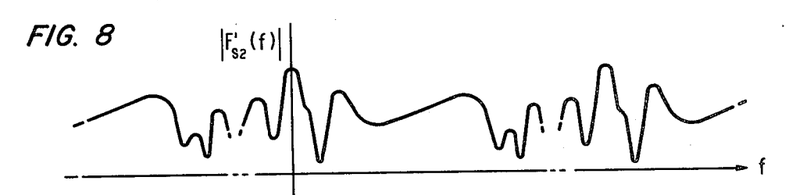
Figure 9:
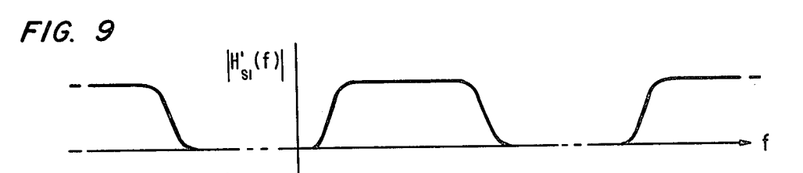
Figure 10:
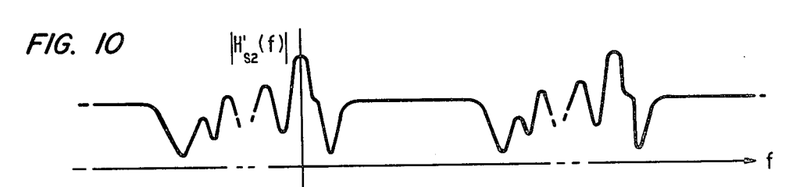

A consequence of the nonoverlapping of the repetitions of G(f) is that a number of fractionally spaced equalizer transfer functions—each corresponding to a different coefficient ensemble—provide substantially the same, minimum mean-squared error. The magnitudes of two such equalizer transfer functions $|F_{s1}'(f)|$ and $|F_{s2}'(f)|$ are shown in FIGS. 7 and 8, respectively. The magnitudes $|H_{s1}'(f)|$ and $|H_{s2}'(f)|$ of the resulting equalized channel transfer functions are shown in FIGS. 9 and 10. From the standpoint of minimizing the mean-squared error, the equalizer transfer functions of FIGS. 7 and 8 are equivalent; since there is no signal energy in the no-energy bands, the fact that $|H_{s2}'(f)|$ is non-zero in these bands is irrelevant—at least in theory.

There is a problem, however. The fact that there is no unique optimum equalizer transfer function means that as the tap coefficient values are updated over time, small biases in the coefficient updating processing hardware—such as biases associated with signal value round-off—can cause at least some of the coefficient values to drift. This corresponds to a drift in the equalizer transfer function. For example, the equalizer transfer function of FIG. 7 may exist right after equalizer start-up, but may drift to that of FIG. 8 after, say, five minutes. Ultimately, some of the coefficient values may drift to such large levels that the registers used to store the coefficients or other signals generated during normal equalizer operation can then overflow, causing severe degradation, or total collapse, of the system response.

In accordance with the invention of the above-cited patent application of J. J. Werner, the sampled signal is caused to have energy in the no-energy bands. The presence of the added energy in the no-energy bands means that if the coefficient values now start to drift, causing the gain of the equalizer transfer function to increase in the no-energy bands, the contribution to the mean-squared error of the energy in the no-energy bands will be non-negligible. The coefficient updating algorithm responds by adjusting the coefficients as to minimize the error. In so doing, it forces the equalizer to have a unique transfer function—one which, like the transfer function of FIG. 7, has substantially zero gain in the no-energy bands. Since a unique transfer function implies a unique set of coefficient values, the coefficient drift problem is substantially eliminated.

Providing the sampled signal with energy in the no-energy bands may be accomplished by introducing an "out of band" signal in digital form at the output of the a/d converter. Alternatively, as in the present illustrative embodiment, the out-of-band signal may be introduced in analog form ahead of the a/d converter. In the latter case, the out-of-band signal may have energy in as few as one no-energy band because the folding which occurs upon sampling causes the sampled signal to have energy in each no-energy band of the sampled channel transfer function, as desired. In a system in which the sampler input is an analytic signal, as in the present illustrative embodiment, the out-of-band signal may have energy in at least one of the frequency bands (0 to $(f_c-(1+\beta)/2T)$) and $((f_c+(1+\beta)/2T)$ to p/T) Hz.

Where the sampler input is not analytic, but is real, the out-of-band signal may have energy in at least one of the frequency bands (0 to $(f_c-(1+\beta)/2T)$) and $((f_c+(1+\beta)/2T)$ to $p/2T)$ Hz.

In receiver 10, in particular, the above-discussed out-of-band signal, denominated n(t), is illustratively provided in analog form from out-of-band signal source 18. Signal n(t) is added to signal q(t) via adder 13 to generate signal q'(t). In accordance with the present invention, signal n(t) is derived from the analog data signal and, in this embodiment, from output signal q(t) of AGC 12. To this end, out-of-band signal source 18, which generates signal n(t), includes a squaring circuit 18a which, in response to signal q(t), generates a signal having energy over a wide frequency band. The output of circuit 18a is filtered in bandpass filter 18b to restrict it to a desired no-energy band.

Figure 11:
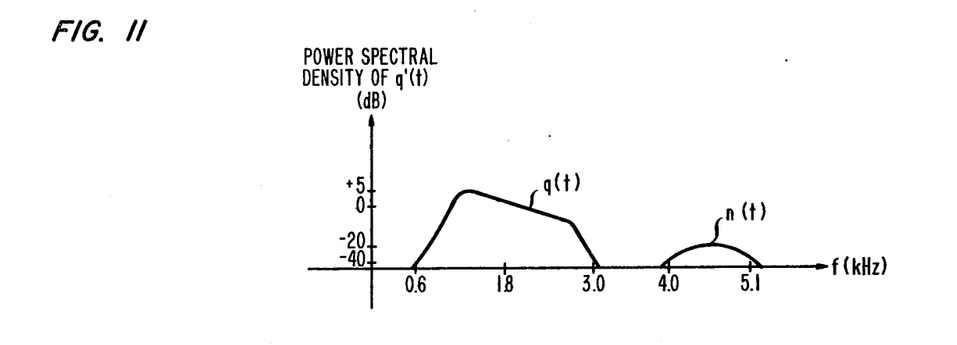
FIG. 11 is a power spectral density vs. frequency plot of a typical analog data signal combined with an out-of-band signal generated in accordance with the present invention.

FIG. 11 is a typical power spectral density vs. frequency plot of adder output signal q'(t). As seen in that FIG., AGC output data signal q(t) extends from 600 to 3000 Hz ($-40$ dB being regarded as the zero-power point), and has a carrier frequency of 1800 Hz. The peak power of signal q(t) is 5 dB greater than its average power over the range 600–3000 Hz.

Signal n(t) should be sufficiently large to provide effective coefficient drift control. As shown in FIG. 11, in particular, an average power 20 dB below the average power of signal q(t) has been found to be appropriate for signal n(t).

Figure 12:
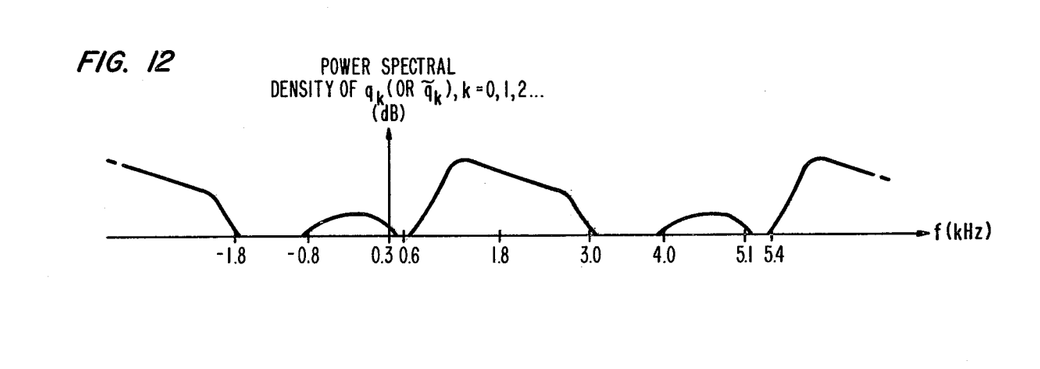
FIG. 12 is a power spectral density vs. frequency plot of the signal of FIG. 11 after sampling.

The spectrum of signal n(t) should be selected such that the data signal energy is not interfered with when signal q'(t) is sampled. This may be appreciated from FIG. 12, which shows that the post-sampling spectrum of signal q'(t), i.e., the spectrum of the sampled signal, i.e., samples $q_k$ (or $\hat{q}_k$), K=0, 1, 2 ..., is comprised in the frequency domain of periodic replicas of data signal q(t) distributed in a first plurality of frequency bands and of the energy of signal n(t) distributed at frequencies intermediate those bands. In this illustration, a frequency range for signal n(t) from 4000 to 5100 Hz is seen to provide energy over the principal portion of each no-energy band without interfering with the energy of the replicas of signal q(t). This frequency range also excludes the second and third harmonics (3600 and 5400 Hz, respectively) of the 1800 Hz retrain tone which is illustratively transmitted from the far end to request transmission to the far end of an equalizer start-up sequence. Excluding these harmonics from signal n(t) causes the latter to have substantially no energy when the retrain tone is received, advantageously avoiding any interference with the detection of the retrain tone.

The foregoing merely illustrates the principles of the invention. Thus, for example, although the invention is illustrated in the context of a system in which each data symbol is represented by data signal values transmitted in a single interval T, it is equally applicable to systems such as that disclosed in U.S. Pat. No. 4,084,137 issued Apr. 11, 1978 to G. R. Welti in which a data symbol is represented by data signal values transmitted in two or more such intervals. Furthermore, the invention is applicable to systems using modulation schemes other than QAM as well as to baseband systems.

Thus it will be appreciated that those skilled in the art will be able to devise numerous arrangements which, although not explicitly disclosed herein, embody the principles of the invention.

What is claimed is:

1. Apparatus for processing a data signal transmitted to said apparatus, said data signal representing a succession of data signal values occurring at T second intervals, said apparatus comprising
   means for forming a sampled signal comprised of a succession of samples occurring at a predetermined rate of p/T samples per second, p>1, said sampled signal being comprised in the frequency domain of periodic replicas of said data signal distributed in a first plurality of frequency bands and of additional energy derived from said data signal and distributed at frequencies intermediate said frequency bands,
   means for equalizing said sampled signal, and
   means for repetitively updating the response of said equalizing means.

2. The invention of claim 1 wherein said data signal has a rolloff factor $\beta$ and wherein $p>(1+\beta)$.

3. The invention of claims 1 or 2 further comprising means for recovering said data signal values from the equalized sampled signal.

4. The invention of claims 1 or 2 wherein said sampled signal forming means includes means for processing said data signal to provide a signal which has energy at at least one of said intermediate frequencies, means for substantially restricting the energy of the resulting processed signal to said at least one of said intermediate frequencies to form an out-of-band signal, means for combining said out-of-band signal with said data signal to form a composite signal, and means for sampling said composite signal at said predetermined rate.

5. The invention of claim 4 wherein said processing means comprises means for squaring said data signal.

6. The invention of claim 4 further comprising means for recovering said data signal values from the equalized sampled signal.

7. The invention of claim 6 wherein said processing means comprises means for squaring said data signal.

8. Apparatus for processing a data signal transmitted to said apparatus with a rolloff factor $\beta$, said data signal representing a succession of data signal values occurring at T second intervals, said apparatus comprising
   means for forming a sampled signal comprised of a succession of samples occurring at a predetermined rate of p/T samples per second, $p>(1+\beta)$, said sampled signal being comprised in the frequency domain of periodic replicas of said data signal distributed in a first plurality of frequency bands and of additional energy derived from said data signal and distributed at frequencies intermediate said frequency bands,
   means operative during successive T second intervals for forming respective equalizer outputs each equal to the sum of the products of a plurality of coefficients with a plurality of said samples,
   means responsive to at least ones of the equalizer outputs for forming decisions as to said data signal values and for forming corresponding error signals, and
   means for updating the values of said coefficients in response to at least ones of said error signals.

9. The invention of claim 8 wherein said updating means is comprised of means for updating the values of said coefficients in such a way as to minimize the average of the value of the squares of said ones of said error signals.

10. The invention of claims 8 or 9 wherein said sampled signal forming means includes means for processing said data signal to provide a signal which has energy at at least one of said intermediate frequencies, means for filtering the resulting processed signal to substantially restrict its energy to said at least one of said intermediate frequencies to form an out-of-band signal, means for combating said out-of-band signal with said data signal to form a composite signal, and means for sampling said composite signal at said predetermined rate.

11. The invention of claim 10 wherein said processing means comprises means for squaring said data signal.

12. Apparatus for use in a receiver which receives a passband signal transmitted to said receiver with a rolloff factor $\beta$ over a transmission channel, said passband signal representing a succession of data signal values occurring at T second intervals, said apparatus comprising means for forming a sampled signal comprised of a succession of samples occurring at a predetermined rate of p/T samples per second, $p>(1+\beta)$, said sampled signal being comprised in the frequency domain of periodic replicas of said passband signal distributed in a first plurality of frequency bands and of additional energy derived from said passband signal and distributed at frequencies intermediate said frequency bands, and signal processing means operative during each one of a succession of T second intervals for forming a decision as to an individual one of said data signal values, said signal processing means comprising equalizer means for multiplying at least individual ones of a predetermined number of the most recently formed ones of said samples with individual ones of a plurality of coefficients, each coefficient having a predetermined value associated with said one of said intervals, means for demodulating the sum of the resulting products to form a baseband output, and means responsive to said baseband output for forming said decision and for forming a passband error signal, said passband error signal being equal to the difference between said sum and a remodulated version of said decision, said equalizer means including means for determining in response to said passband error signal the value of said each coefficient associated with a subsequent one of said intervals.

13. The invention of claim 12 wherein said sampled signal forming means is comprised of signal combining means for combining with said passband signal a second signal having energy at frequencies at which the transfer function of said transmission channel has substantially zero gain and means for sampling the output of said signal combining means at said predetermined rate.

14. The invention of claim 13 wherein said received passband signal has a carrier frequency $f_c$ and wherein $\beta=(2f_{co}T-1)$, $(f_c+f_{co})$ being the highest frequency at which the transfer function of said transmission channel has substantially zero gain.

15. The invention of claim 13 wherein said determining means includes means for combining an updating term with the value of said each coefficient associated with said one of said intervals, the magnitude of said updating term being equal to a predetermined fraction of the product of a passband error signal formed during a predetermined one of said intervals with the sample with which said one coefficient was multiplied during said predetermined one of said intervals.

16. An arrangement for processing a data signal transmitted to said arrangement with a rolloff factor $\beta$ over a transmission channel at 1/T data signal values per second, said arrangement comprising means for combining a second signal with said data signal to generate a combined signal, said second signal being derived from said data signal and having energy at frequencies at which the transfer function of said transmission channel has substantially zero gain, means for forming samples of said combined signal at a rate of p/T samples per second, $p>(1+\beta)$, means for equalizing said samples, means for forming decisions as to said data signal values in response to the equalized samples, and means for repetitively updating the response of said equalizing means.

17. An arrangement for processing a data signal transmitted to said arrangement with a rolloff factor $\beta$ over a transmission channel at 1/T data signal values per second, said arrangement comprising signal combining means for combining a second signal with said data signal to generate a combined signal, said second signal being derived from said data signal and having energy at frequencies at which the transfer function of said transmission channel has substantially zero gain, means responsive to said combined signal for forming a sampled signal at a rate of p/T samples per second, $p>(1+\beta)$, means operative during successive T second intervals for forming respective equalizer outputs each equal to the sum of the products of a plurality of coefficients with respective ones of a plurality of said samples, means responsive to at least ones of the equalizer outputs for forming decisions as to said data signal values and for forming corresponding error signals, and means for updating the values of said coefficients in response to at least ones of said error signals.

18. The invention of claim 17 wherein said data signal is a passband signal having a carrier frequency $f_c$ and wherein the highest frequency at which the transfer function of said transmission channel has substantially non-zero gain is $(f_c+(1+\beta)/2T)$.

19. The invention of claim 18 wherein said updating means is comprised of means for updating each of said coefficients in such a way as to minimize the average of the value of the squares of said ones of said error signals.

20. The invention of claims 13, 14, 15, 18 or 19 wherein said signal combining means includes means for processing said passband signal so as to provide a signal having energy at said frequencies of which said transfer function has substantially zero gain, and means for generating said second signal by restricting the energy of the resulting processed passband signal to at least ones at those frequencies.

21. A method for processing a received data signal, said data signal representing a succession of data signal values occurring at T second intervals, said method comprising the steps of forming a sampled signal comprised of a succession of samples occurring at a predetermined rate of p/T samples per second, $p>1$, said sampled signal being comprised in the frequency domain of periodic replicas of said data signal distributed in a first plurality of frequency bands and of additional energy derived from said data signal and distributed at frequencies intermediate said frequency bands,
equalizing said sampled signal, and
repetitively updating the response of said equalizing means.

22. The invention of claim 21 wherein said data signal has a rolloff factor $\beta$ and wherein $p>(1+\beta)$.

23. The invention of claims 21 or 22 comprising the further steps of recovering said data signal values from the equalized sampled signal.

24. The invention of claims 21 or 22 wherein said sampled signal forming step includes the steps of processing said data signal to provide a signal which has energy at at least one of said intermediate frequencies, substantially restricting the energy of the resulting processed signal to said at least one of said intermediate frequencies to form an out-of-band signal with said data signal to form a composite signal, and sampling said composite signal at said predetermined rate.

25. The invention of claim 24 wherein said processing step comprises the step of squaring said data signal.

26. The invention of claim 24 comprising the further step of recovering said data signal values from the equalized sampled signal.

27. The invention of claim 26 wherein said processing step comprises the step of squaring said data signal.

28. A method for processing a received data signal having a rolloff factor $\beta$, said data signal representing a succession of data signal values occurring at T second intervals, said method comprising the steps of
forming a sampled signal comprised of a succession of samples occurring at a predetermined rate of p/T samples per second, $p>(1+\beta)$, said sampled signal being comprised in the frequency domain of periodic replicas of said data signal distributed in a first plurality of frequency bands and of additional energy derived from said data signal and distributed at frequencies intermediate said frequency bands,
forming during successive T second intervals respective equalizer outputs each equal to the sum of the products of a plurality of coefficients with a plurality of said samples, forming in response to at least one of the equalizer outputs decisions as to said data signal values and corresponding error signals, and
updating the values of said coefficients in response to at least ones of said error signals.

29. The invention of claim 28 wherein said updating step is comprised of the step of updating the values of said coefficients in such a way as to minimize the average of the value of the squares of said ones of said error signals.

30. The invention of claims 28 or 29 wherein said sampled signal forming step includes the steps of processing said data signal to provide a signal which has energy at at least one of said intermediate frequencies, filtering the resulting processed signal to substantially restrict its energy to said at least one of said intermediate frequencies to form an out-of-band signal, combining said out-of-band signal with said data signal to form a composite signal, and sampling said composite signal at said predetermined rate.

31. The invention of claim 30 wherein said processing step comprises the step of squaring said data signal.

32. A method for use in a receiver which receives a passband signal transmitted to said receiver with a rolloff factor $\beta$ over a transmission channel, said passband signal representing a succession of data signal values occurring at T second intervals, said method comprising the steps of
forming a sampled signal comprised of a succession of samples occurring at a predetermined rate of p/T samples per second, $p>(1+\beta)$, said sampled signal being comprised in the frequency domain of periodic replicas of said passband signal distributed in a first plurality of frequency bands and of additional energy derived from said passband signal and distributed at frequencies intermediate said frequency bands, and
forming during each one of a succession of T second intervals for a decision as to an individual one of said data signal values, said decision forming step comprising the steps of
multiplying at least individual ones of a predetermined number of the most recently formed ones of said samples with individual ones of a plurality of coefficients, each coefficient having a predetermined value associated with said one of said intervals,
demodulating the sum of the resulting products to form a baseband output,
forming in response to said baseband output said decision and a passband error signal, said passband error signal being equal to the difference between said sum and a remodulated version of said decision, and
determining in response to said passband error signal the value of said each coefficient associated with a subsequent one of said intervals.

33. The invention of claim 32 wherein said sampled signal forming step is comprised of the steps of combining with said passband signal a second signal having energy at frequencies at which the transfer function of said transmission channel has substantially zero gain and sampling the output of said signal combining means at said predetermined rate.

34. The invention of claim 33 wherein said received passband signal has a carrier frequency $f_c$ and wherein $\beta=(2f_{co}T-1)$, $(f_c+f_{co})$ being the highest frequency at which the transfer function of said transmission channel has substantially zero gain.

35. The invention of claim 33 wherein said determining step includes the step of combining an updating term with the value of said each coefficient associated with said one of said intervals, the magnitude of said updating term being equal to a predetermined fraction of the product of a passband error signal formed during a predetermined one of said intervals with the sample with which said one coefficient was multiplied during said predetermined one of said intervals.

36. A method for use in an arrangement which receives a data signal transmitted to said arrangement with a rolloff factor $\beta$ over a transmission channel at 1/T data signal values per second, said method comprising the steps of
combining a second signal with said data signal to generate a combined signal, said second signal being derived from said data signal and having energy at frequencies at which the transfer function of said transmission channel has substantially zero gain,
forming samples of said combined signal at a rate of p/T samples per second, $p>(1+\beta)$,
equalizing said samples,
forming decisions as to said data signal values in response to the equalized samples, and repetitively updating the response of said equalizing means.

37. A method for use in an arrangement which receives a data signal transmitted to said arrangement with a rolloff factor $\beta$ over a transmission channel at 1/T data signal values per second, said method comprising the steps of combining a second signal with said data signal to generate a combined signal, said second signal being derived from said data signal and having energy at frequencies at which the transfer function of said transmission channel has substantially zero gain, forming in response to said combined signal a sampled signal at a rate of p/T samples per second, $p > (1+\beta)$, forming during successive T second intervals respective equalizer outputs each equal to the sum of the products of a plurality of coefficients with respective ones of a plurality of said samples, forming in response to at least ones of the equalizer outputs decisions as to said data signal values and corresponding error signals, and updating the values of said coefficients in response to at least ones of said error signals.

38. The invention of claim 37 wherein said data signal is a passband signal having a carrier frequency $f_c$ and wherein the highest frequency at which the transfer function of said transmission channel has substantially non-zero gain is $(f_c+(1+\beta)/2T)$.

39. The invention of claim 38 wherein said updating step is comprised of the step of updating each of said coefficients in such a way as to minimize the average of the value of the squares of said ones of said error signals.

40. The invention of claims 33, 34, 35, 38 or 39 wherein said second signal combining step includes the steps of processing said passband signal so as to provide a signal having energy at said frequencies at which said transfer function has substantially zero gain, and generating said second signal by restricting the energy of the resulting processed passband signal to at least ones of those frequencies.

* * * * *